United States Patent [19]

Hashimoto et al.

[11] 4,285,043
[45] Aug. 18, 1981

[54] POWER TRANSMISSION CONTROLLER FOR ELECTRONIC CALCULATORS

[75] Inventors: Shintaro Hashimoto, Nara; Sadakatsu Hashimoto, Yamatokoriyama; Isamu Washizuka, Kyoto, all of Japan

[73] Assignee: Sharp Kabushiki Kaisha, Osaka, Japan

[21] Appl. No.: 75,134

[22] Filed: Sep. 12, 1979

Related U.S. Application Data

[63] Continuation of Ser. No. 835,206, Sep. 21, 1977, abandoned.

[30] Foreign Application Priority Data

Sep. 21, 1976 [JP] Japan ............................ 51-113876
Sep. 24, 1976 [JP] Japan ............................ 51-115212

[51] Int. Cl.³ .......................... G06F 1/00; G06F 3/14
[52] U.S. Cl. ............................... 364/707; 364/900
[58] Field of Search ........................... 364/707, 900

[56] References Cited

U.S. PATENT DOCUMENTS

| | | | |
|---|---|---|---|
| 3,428,793 | 2/1969 | Scuitto ............................ | 364/710 |
| 3,643,219 | 2/1972 | Heimann ......................... | 364/200 |
| 3,855,577 | 12/1974 | Vandierendonck ............. | 364/200 |
| 3,922,526 | 11/1975 | Cochran ......................... | 364/707 |
| 3,938,138 | 2/1976 | Kojima et al. .................. | 340/811 |
| 3,941,989 | 3/1976 | McLaughlin et al. .......... | 364/707 |
| 3,955,185 | 5/1976 | Nishimura ...................... | 364/707 |
| 4,125,871 | 11/1978 | Martin ............................ | 364/900 |

Primary Examiner—David H. Malzahn
Attorney, Agent, or Firm—Birch, Stewart, Kolasch and Birch

[57] ABSTRACT

Disclosed is a power transmission controller for an electronic calculator which controls power transmission to a computation circuit and a display device included within the electronic calculator. The power transmission controller indicates a forthcoming termination of the power transmission at a first stage in unison with a first control signal derived from a timer circuit through said display device. Then the power transmission controller terminates said power transmission at the second stage in accordance with a second control signal derived from the timer circuit. A clear key for conducting a clear operation functions to initiate the power transmission to said computation circuit and said display device.

10 Claims, 2 Drawing Figures

POWER TRANSMISSION CONTROLLER FOR ELECTRONIC CALCULATORS

This application is a continuation, of copending application Ser. No. 835,206, filed on Sept. 21, 1977, now abandoned.

BACKGROUND OF THE INVENTION

The present invention relates to a power transmission controller for an electronic calculator and, more particularly, to a power transmission controller for an electronic calculator which controls power supply to a computation circuit and a display device included within the electronic calculator and firstly indicates the termination of the power supply to them through said display device.

A prior power transmission controller for an electronic calculator is disclosed in U.S. Pat. No. 3,755,806, "CALCULATOR DISPLAY CIRCUIT" patented on Aug. 28, 1973, wherein a display circuit for use in an electronic calculator includes a computing circuit for receiving and manipulating digital data and further includes means for automatically turning "off" or "blanking" a display device for the electronic calculator after a predetermined period of time between data entries. The above U.S. Patent discloses a blanking means for automatically extinguishing the display device of said electronic calculator after the lapse of a predetermined period of time.

However, the power supply to the computing circuit is not controlled in the above mentioned power transmission controller. It is preferable to control the power consumption for the computing circuit because the computing circuit consumes more power than the display device which is made of liquid crystal materials.

OBJECTS AND SUMMARY OF THE INVENTION

Accordingly, an object of the present invention is to provide an improved power transmission controller for an electronic calculator.

Another object of the present invention is to provide an improved power transmission controller for an electronic calculator, said power transmission controller controlling power transmission to a computing circuit and a display device included within the electronic calculator and firstly indicating the forthcoming termination of the power transmission to said computing circuit and said display device with a control signal for terminating the power transmission through said display device.

Still another object of the present invention is to provide an improved power transmission controller for an electronic calculator, said power transmission controller controlling power transmission to a computing circuit and a display device included within the electronic calculator and indicating the forthcoming termination of the power transmission to said computing circuit and said display device with a control signal for terminating the power transmission through said display device, and comprising a clear key means functioning as a clearing operation of stored information, initiating the power transmission to said computing circuit and said display device.

To achieve the above objects, pursuant, to an embodiment of the present invention, a power transmission controller comprises a flip-flop means responsive to a control signal for introducing and terminating the power transmission to a computing circuit and a display device included within an electronic calculator and switching means responsive to the level of output developed from said flip-flop means, and a clear key means for generating said control signal to initiate and thus to introduce the power transmission to said computing circuit and said display device. Said power transmission controller further comprises an indication circuit for providing an indication signal which allows an alarm indication to enable said display device, said alarm indication designating that the power transmission to said computing circuit and said display devices soon will terminate.

Said flip-flop means always receives the power transmission it being responsive to a control signal for introducing and terminating the power transmission to said computing circuit and said display device. Said clear key means always receives the power transmission to initiate the power transmission to said computing circuit and said display means. Said indication signal is derived through timer means associated with the flip-flop means.

BRIEF DESCRIPTION OF THE DRAWINGS

The present invention will become clear from the detailed description given hereinbelow and the accompanying drawings which are given by way of illustration only, and thus are not limitative of the present invention and wherein.

DESCRIPTION OF THE PREFERRED EMBODIMENTS

Figure 1:
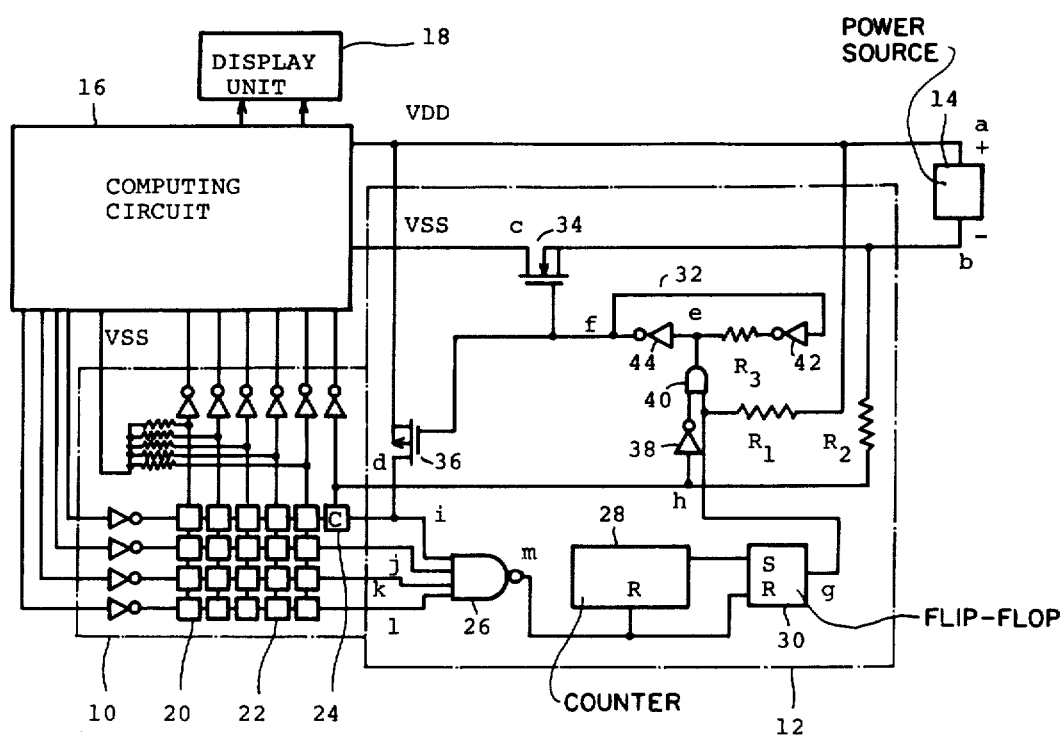
FIGS. 1 and 2 are circuit configurations of embodiments of a power transmission controller for an electronic calculator of the present invention.

FIG. 1 shows a power transmission controller for an electronic calculator of the present invention comprising a key input unit 10, a control circuit 12 a power source 14, a computing circuit 16, and a display unit 18.

Said key input unit 10 includes numeral keys 20 for introducing numeral information, function keys 22 for directing respective functions, and a clear key 24 for performing a clearing operation of the stored information. Outputs from the numeral keys 20, function keys 22, and the clear key 24 are introduced into a NAND gate 26 included within said control circuit 12, said NAND gate 26 receiving strobe signals i, j, k and l. Said strobe signals i, j, k and l which have different phases, respectively, are derived from said computing circuit 16.

Said control circuit 12 mainly comprises the NAND gate 26, a counter 28, an RS flip-flop 30, a flip-flop 32, an N-channel MOS switching transistor 34, and a P-channel MOS switching transistor 36. Said flip-flop 32 controls the power transmission to said computing circuit 16 and to said display unit 18 from the power source 14. The flip-flop 32 also develops an output signal to the switching transistors 34, 36 to switch them because said flip-flop 32 always receives the power transmission from the power source 14.

An output m from the NAND gate 26 is introduced into the reset terminal R of the counter 28 and the reset terminal R of the RS flip-flop 30. An output from the counter 28 is introduced into the set terminal S of the RS flip-flop 30 to develop an output line from the RS flip-flop 30 to a positive terminal a of the power source 14 through a resistor $R_1$. A negative terminal b of the power source 14 is connected to the clear key 24 through a resistor $R_2$. The clear key 24 develops an input signal h which is introduced into an inverter 38. The output g and an output from the inverter 38 are applied to an AND gate 40.

Said flip-flop 32 comprises an inverter 42, a resistor $R_3$, and an inverter 44 which receives an output e from the AND gate 40 and develops an output f to the inverter 42. The output f is applied to the gates of the N-channel switching transistor 34 and the P-channel switching transistor 36. The positive terminal a of the power source 14 is also connected to the computing circuit 16, a positive terminal of said computing circuit 16 being maintained at VDD and a negative terminal thereof being held at VSS through the N-channel switching transistor 34. The positive terminal a is further connected to the drain of the P-channel switching transistor 36. The negative terminal b is also connected to the drain of the N-channel switching transistor 34. The source d of the P-channel switching transistor 36 is connected to the clear key 24. The source c of the N-channel switching transistor 34 is connected to the negative terminal of the computing circuit 16.

When the output f of the flip-flop 32 is at a low level, the N-channel switching transistor 34 is non-conductive to maintain the high level of the source c of the N-channel switching transistor 34 because the negative terminal of the VSS level of the computing circuit 16 is substantially drawing up by the positive terminal of the VDD level thereof through a impedance means in the computing circuit 16. The source d of the P-channel switching transistor 36 is at the high level of the VDD level since the P-channel switching transistor 36 is conductive. The input signal h of the clear key 24 is at a low level because the input signal h is present on a line connected to the negative terminal b of the power source 14 through the resistor $R_2$.

The output g of the RS flip-flop 30 is at a high level through the resistor $R_1$ connected to the positive terminal a of the power source 14, because the RS flip-flop 30 receives signals of the high level. The output e of the AND gate 40 is high level on the condition that the output g of the RS flip-flop 30 and the input h of the clear key 24 are low level. The output f of the flip-flop 32 maintains low level to hold the non-conductiveness of the N-channel switching transistor 34.

When the clear key 24 is activated, the terminal of the output h thereof is short-circuited to the source d of the P-channel switching transistor 36 of the high level thereby holding the high level of the input h of the clear key 24. This causes current to flow through the resistor $R_2$ into the negative terminal b of the power source 14. The output e of the AND gate 40 is converted to a low level to change the output f of the flip-flop 32, whereby the N-channel switching transistor 34 is conductive and, simultaneously, the P-channel switching transistor 36 is non-conductive to convert the input h of the clear key 24 into the low level again.

Meanwhile, the output m of the NAND gate 26 is at a high level to reset the RS flip-flop 30 thereby developing the output g of the low level. The output e of the AND gate 40 is maintained to be the low level and the output f of the flip-flop 32 is at the high level to maintain the conductiveness of the N-channel switching transistor 34. This causes power transmission to be supplied to the computing circuit 16 comprising complementary MOS LSI and the display unit 18 from the power source 14.

Then the counter 28 begins to count pulses by a predetermined number to control said power transmission until it develops a set signal into the RS flip-flop 30 revealing the output g of the RS flip-flop to be at the low level. The output e of the AND gate 40 is at the high level on the condition that the output g of the RS flip-flop 30 is at the high level and the input h of the clear key 24 has already been at the low level. This permits the output f of the flip-flop 32 to convert into the low level, thereby eliminating the power transmission to the computing circuit 16 and the display unit 18 from the power source 14 by causing the N-channel switching transistor (34) to switch to a non-conductive state.

Meanwhile, when the computing circuit 16 is operated, the key strobing signals i, j, k and l are at the high levels, respectively, thereby developing the output m of the NAND gate 26 at the low level. This does not actuate to the counter 28 or the RS flip-flop 30. The actuation of one of the numeral keys 20, the function keys 22, and the clear key 24 makes the key strobing signal corresponding to the actuation thereof convert to transform the NAND gate 26. The counter 28 and the RS flip-flop 30 are reset when the output m of the NAND gate 26 rises to the high level. That is, every time one of the numeral keys 20, the function keys 22, and the clear key 24 is actuated, the contents of the counter 28 is cleared.

When the N-channel switching transistor 34 is non-conductive, the input h of the inverter 38 is not at the high level until the clear key 24 is actuated. The N-channel switching transistor 34 is not conductive since the output f of the N-channel switching transistor 34 is not the high level. It is apparent from the above description that no actuation of the numeral keys 20 and the function keys 22 supply the power energy to the computing circuit 16 and the display unit 18. The excitation of the clear key 24 only, allows the power transmission to the computing circuit 16 and the display unit 18 to begin, thereby eliminating the extra handling for functioning the clear operation of stored information through auto-clear circuits.

The computing circuit 16 comprises ED-MOS or complementary MOS LCS, neglecting the power consumption in said complementary MOS IC.

Figure 2:
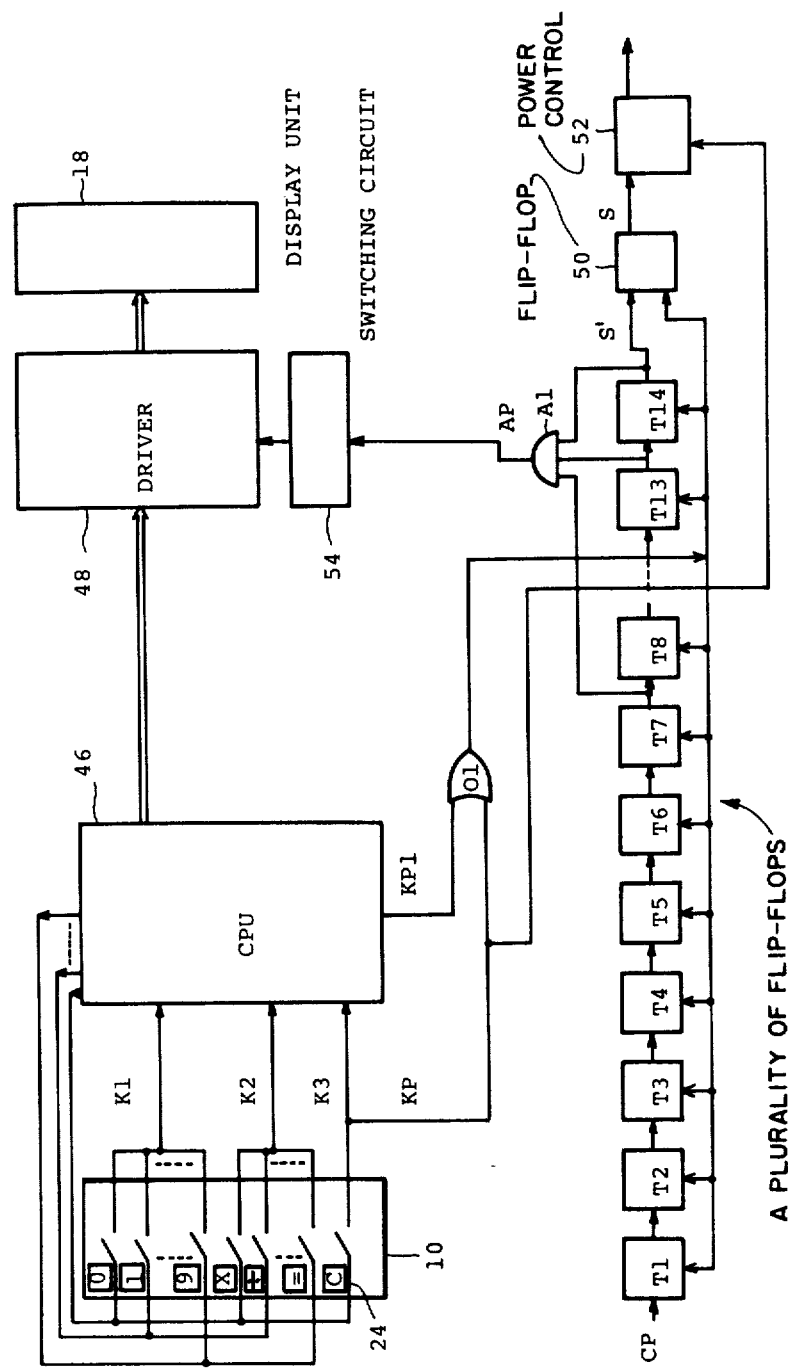

Now attention is directed to FIG. 2, wherein a power transmission controller of the present invention is disclosed thereby specially explaining an indication circuit which generates an indication signal. This indication circuit allows for an alarm indication, said alarm indication designating that the power transmission to said computing circuit 16 and said display unit 18 should soon terminate. The clear key functions to initiate the power transmission to said computing circuit 16 and said display unit 18, and, simultaneously, to reset a timer circuit for counting the predetermined time period by which to terminate the power transmission to the computing circuit and the display unit.

FIG. 2 specifically shows the timer means which is inclusive in the counter (28) of FIG. 1. Like elements corresponding to those of FIG. 1 are indicated by like numerals.

A CPU 46 is provided for controlling information induced into the electronic calculator, occupying the considerable portion of the computing circuit 16. A driver 48 functions to drive the display unit 18.

T-type flip-flops T1 through T14 are cascade-connected to establish a counter having capacitance of "16384" counts. A T-type flip-flop 50 is provided being set in accordance with the output S' of the flip-flop T14 from the high level to the low level and, simultaneously, developing the output s of the high level introduced into a power control 52. The power control 52 is associated with the flip-flop 32 of FIG. 1. That is, the power control 52 terminates the power transmission to the computing circuit 16 and the display unit 18. The T-type flip-flops T1 through T14 correspond to the counter 28 of FIG. 1. The flip-flop T1 through T14 and 50 are reset by key input signal KP caused by the clear key 24 and key input signal KP1 caused by the remaining keys 20, 22. A clock pulse CP has twelve (12) msec period to provide a reference signal.

A key input signal K1 is generated in accordance with the numeral keys 20 and a key input signal K2 is developed through the actuation of the function keys 22. A key input signal K3 is generated in accordance with the clear key 24. The key input signal K1, K2, and K3 are introduced into the CPU 46 to provide respective information or instructions. An output signal KP1 is generated from the CPU 46 in accordance with the numeral keys 20 and the function keys 22 to be introduced into an OR gate O1 together with an input KP caused by the clear key 24. The output signal KP1 and the input signal KP both operate to reset the flip-flops T1 through T14 and flip-flop 50.

The counter comprising the flip-flops T1 through T14 progressively counts the clock pulse CP to control the power transmission to the computing circuit 16 and the display unit 18. When the counter counts twelve thousand, two hundred eighty-eight (12,288) pulses, the contents of the flip-flops T1 through T14 are "00000000000011" and the outputs of the flip-flops T13, T14 are maintained to be the high level. An AND gate A1 receives the outputs of the flip-flops T7, T13 and T14 to develop an output AP of the high level in unison with the counts of sixty-four (64) pulses, because the output of the flip-flop T7 is the high level every time sixty-four (64) pulses of the clock pulse CP are reached. Two (2) minutes and thirty (30) seconds are required after the last actuation of one of the keys 20, 22 and 24 to permit the flip-flops T13, T14 to be the high level since the clock pulse CP has a twelve (12) msec period. Point 8 (0.8) seconds are required to establish the flip-flop T7 of the high level. Therefore, the output signal AP of the AND gate A1 is developed, when two (2) minutes and thirty (30) seconds elapses after the reset of all of the flip-flops T1 through T14. At this time, once the output signal AP initially reaches a high level, the output signal AP will maintain its high level every time (0.8) seconds has elapsed.

The output AP controls a switching circuit 54 for suppressing the power transmission to the driver 48, switching off all of the numeral information indicated on the display unit 18 in unison with the conductiveness of the AND gate A1. The flip-flop T14 develops the output S' of the low level to set the flip-flop 50, when the counts of the clock pulse CP reaches sixteen thousand, three hundred eighty-four (16,384), say, three (3) minutes and seventeen (17) seconds after reset of all flip-flops T1-T14. This causes the generation of the output s of the high level to terminate the power transmission to the computing circuit 16 and the display unit 18.

The clock pulse CP is utilized by a backplate signal applied to a backplate for a liquid crystal cell included within display unit 18. The above-mentioned blinking of the numeral information indicated on the display unit 18 can be replaced by the alarm indication shown by the succession of an extra indication, one of said extra indications being a minus indication which designates the stored information to be minus.

Although the present invention has been described and illustrated in detail, it is to be clearly understood that the same is by way of illustration and example only and is not to be taken away by way of limitation, the spirit and scope of the present invention, being limited only by the terms of the appended claims.

What is claimed is:

1. An electronic calculator comprising:
   power source means for providing a source of energy;
   key input means having a plurality of keys disposed thereon for introducing information into said electronic calculator;
   computing circuit means energized by said energy from said power source means and responsive to actuation of said keys on said key input means for receiving said information from said key input means and for processing said information, said computing circuit means being normally disconnected from said power source means when said electronic calculator is not in use; and
   switching means connected in electrical series between said power source means and said computing circuit means and responsive to actuation of said keys on said key input means for connecting said power source means to said computing circuit means in response to actuation of one of said keys on said key input means and for disconnecting said power source means from said computing circuit means when a predetermined period of time has elapsed since the most recent actuation of one of said keys on said key input means,
   said switching means being continually energized at all times by said energy from said power source means including the periods of time when said power source means has been disconnected from said computing circuit means.

2. An electronic calculator in accordance with claim 1, wherein said switching means further comprises:
   timer means responsive to actuation of said one of said keys on said key input means for initially resetting in response thereto and providing a count of the elapsed time since actuation of said one of said keys, said timer means being subsequently reset in response to the most recent actuation of another of said keys thereby restarting said count, said switching means connecting said power source means to said computing circuit means in response to the initial resetting of said timer means,
   said timer means generating a control signal when said predetermined period of time has elapsed since the subsequent reset of said timer means, said switching means disconnecting said power source means from said computing circuit means in response to said control signal.

3. An electronic calculator in accordance with claim 2, wherein said switching means further comprises:
   first switching means connected to said power source means, to said timer means, and to said one of said keys on said key input means for switching to a first switched state in response to actuation of said one of said keys on said key input means and for switching to a second switched state in response to said control signal from said timer means, said first switching means being continually energized at all times by said energy from said power source means including the periods of time when said power source means has been disconnected from said computing circuit means; and second switching means interposed in electrical series between said power source means and said computing circuit means for connecting said power source means to said computing circuit means in response to the switching of said first switching means to said first switched state and for disconnecting said power source means from said computing circuit means in response to the switching of said first switching means to said second switched state.

4. An electronic calculator in accordance with claim 3, wherein said timer means comprises counter means responsive to actuation of said keys on said key input means for resetting in response thereto and for providing said count of the elapsed time since the most recent actuation of said another of said keys on said key input means, said counter means developing an output signal when said predetermined period of time has elapsed since the subsequent reset of said timer means; and flip-flop means responsive to said output signal from said counter means and to actuation of said keys on said key input means for developing said control signal in response to the development of said output signal from said counter means, said flip-flop means being reset in response to actuation of said keys on said key input means.

5. An electronic calculator in accordance with claim 4, wherein:

said one of said keys on said key input means comprises a clear key;

actuation of said clear key resets said timer means, said first switching means switching to said first switched state in response to actuation of said clear key; and said second switching means connects said power source means to said computing circuit means in response to the switching of said first switching means to said first switched state.

6. An electronic calculator in accordance with claim 5, further comprising:

clock pulse generating means for generating a plurality of clock pulses;

wherein said counter means further includes a plurality of flip-flop means interconnected together in series, said plurality of flip-flop means generating said output signal when each of said flip-flop means are set in response to energization by said clock pulses from said clock pulse generating means.

7. An electronic calculator in accordance with claims 1 or 5, further comprising:

display means connected to said computing circuit means for displaying the results of the processing of said information received from said key input means.

8. An electronic calculator in accordance with claim 7, wherein said display means includes an alarm means for producing an alarm indicating that said energy supplied from said power means to said computing circuit means will soon terminate.

9. An electronic calculator in accordance with claim 8, wherein said alarm means comprises a blinking information signal on said display means.

10. An electronic calculator in accordance with claim 8, wherein said alarm means comprises a discrete indicating portion within the display area of said display means.

* * * * *